United States Patent [19]

Femböck

[11] Patent Number: 4,761,991

[45] Date of Patent: Aug. 9, 1988

[54] METHOD AND APPARATUS FOR CHECKING THE CHASSIS OF A MOTOR VEHICLE

[75] Inventor: Josef Femböck, Neuötting, Fed. Rep. of Germany

[73] Assignee: Richard Langlechner GmbH, Unterneukirchen, Fed. Rep. of Germany

[21] Appl. No.: 943,754

[22] Filed: Dec. 19, 1986

[30] Foreign Application Priority Data

Dec. 19, 1985 [DE] Fed. Rep. of Germany ....... 3545087

[51] Int. Cl.⁴ .......................................... G01M 17/04
[52] U.S. Cl. ......................................................... 73/11
[58] Field of Search .......................................... 73/11

[56] References Cited

U.S. PATENT DOCUMENTS

| | | |
|---|---|---|
| 3,157,044 | 11/1964 | Branick . |
| 3,164,003 | 1/1965 | MacMillan . |
| 3,456,489 | 7/1969 | Levenson . |
| 3,906,779 | 9/1975 | Graham et al. ........................ 73/11 |

FOREIGN PATENT DOCUMENTS

| | | |
|---|---|---|
| 2401301 | 7/1974 | Fed. Rep. of Germany . |
| 2332349 | 1/1975 | Fed. Rep. of Germany . |
| 2335886 | 1/1975 | Fed. Rep. of Germany . |

Primary Examiner—Charles A. Ruehl
Attorney, Agent, or Firm—Fleit, Jacobson, Cohn & Price

[57] ABSTRACT

A method and apparatus for checking the state of the chassis of a motor vehicle, wherein the motor vehicle is brought onto a position holding means spaced over a support and then the position holding means is removed so that the motor vehicle falls with its front or rear axle in free fall on the support, and wherein (1) the spacing between the position holding means and the support, which corresponds to the height of fall of the motor vehicle, is selected so that it corresponds essentially to the residual spring deflection (distance between wheel axle and buffer stop) predetermined by the design of the motor vehicle but does not exceed this, (2) the position holding means is removed at least as quickly as the particular wheel or wheels of the motor vehicle to be tested would fall under the action of the force of gravity and the simultaneous action of the relaxing spring present between wheel and body, ignoring the oppositely directed action of the shock absorber and the frictional forces (for example in the axle joint bearing and in the springs) and (3) the course in time of the wheel pressure acting on the support is measured.

11 Claims, 4 Drawing Sheets

METHOD AND APPARATUS FOR CHECKING THE CHASSIS OF A MOTOR VEHICLE

The invention relates to a method of checking the state of the chassis of a motor vehicle wherein the motor vehicle is brought onto a position holding means disposed with spacing above a base and then the position holding means is removed, as well as an apparatus for carrying out the method.

It is known that in order to judge the roadworthiness of a motor vehicle, it is desirable to check the state of the shock absorbers, the suspension and the axle joints.

In practice, the most usual method of finding a fault in a shock absorber is to rock the vehicle by hand in order to draw conclusions about the state of the shock absorber from the oscillation behaviour of the vehicle. This is a purely subjective method which depends on the experience of the mechanic and cannot make any claim to accuracy.

A test method has been derived from this procedure which enables a comparison to be made between the state of the shock absorber and that of satisfactory shock absorbers.

In this test method, the motor vehicle is driven onto a holding means on a platform raised above the ground. After locking of the holding means has been released, the motor vehicle falls through the difference in height between platform and ground. At the same time, the body is excited to oscillate. The oscillations are recorded through a measuring linkage connected to the body. By this means, really only information about the riding comfort of the motor vehicle can be obtained, because during the test the behaviour of the body on variations in the road surface is simulated. Information about characteristics of the shock absorber is only indirectly available, however, because in this case comparison of the progress of the oscillation can only be made with the data of satisfactory shock absorbers compiled in the form of lists by the shock-absorber manufacturers. This is not suitable, however, for estimating the actual state of the shock absorber to be checked and for giving sufficiently accurate information about the state of a shock absorber.

In particular, the method described is not suitable for judging the shock absorbers used in independent suspension vehicles. During the free fall, the wheel here travels through an arcuate path as a result of the resilience between body and wheel axle, the course of which path is determined by the wheel axle, mounted in the joint, as a radius. The wheel therefore hits the ground in a position deflected from the vertical. This leads to a certain jamming of the spring system so that this can no longer oscillate freely. Thus the actual oscillation behaviour of the motor vehicle when travelling cannot be simulated with this method of measurement, although this is necessary for a correct judgement of the results of the measurement.

Also, the known test method does not permit any differentiation between the behaviour of the shock absorber, the damping characteristics of the axle joint, and the behaviour of the wheel vibrations in comparison with the body oscillation. It provides, rather, generalized information about the cooperation of the above-mentioned oscillation influences, that is to say, as already stated above, a generalized assessment of the riding comfort which is then incorrectly designated as a judgement on the shock absorber because the behaviour of the shock absorber is only included in the result of the measurement to a minimum extent. Moreover, since in the method described above, the load in the motor vehicle, and its tank contents, are included in the result of the measurement, the reliability of the judgement is put still further in question.

It is the object of the present invention to suggest a method which enables the state of the shock absorber, the characteristics of the axle joints, and the behaviour of the wheel vibrations, each to be detected independently in a form matched to their behaviour during travel, and to indicate an apparatus for carrying out this method.

According to the invention, in a method of the type mentioned at the beginning 1. the distance between the position holding means and the base, which corresponds to the height of fall of the motor vehicle, that is to say the height of fall of its front or rear axle, is selected so that it corresponds substantially to the residual spring deflection (distance between wheel axle and a buffer stop) predetermined by the design of the motor vehicle, but does not exceed this, 2. the position holding means is removed at least as quickly as the wheel or wheels of the motor vehicle to be tested could fall under the action of the force of gravity and the additional action of the springs present between wheel and body, and relaxing, ignoring the oppositely directed action of the shock absorber and of the frictional forces (for example in the axle joint bearing and in the springs), and 3. the course in time of the wheel pressure acting on the base is measured.

In this method, the procedure mentioned under No. 2 is of particularly great importance for the correctness of the measuring results obtained. As soon as the holding means is pulled away from under the motor vehicle, the elastic forces present in the vehicle can develop freely. This means that the spring present between the body and the wheel, which is compressed because of the weight of the vehicle when the vehicle is resting on the holding means, can relax and at the same time the falling speed of the wheels determined by the acceleration due to gravity increases. Since the wheel mass is very small in comparison with the mass of the body, the relaxation of the spring acts almost entirely on the wheels and imparts an additional acceleration to these, the magnitude of which depends, however, on the state of the shock absorbers and the axle joints. This means that the wheels move quickly ahead of the body, strike the base and impart their vibrations to this before the mass of the body participates in the oscillation.

As a result of the wheels moving ahead of the body, due to the elastic forces released and acting on them, the distance of the wheels from the body changes. In every motor vehicle, rubber stop buffers are provided to prevent excessive vibrational deflections of the wheels. If the wheel axle moving ahead of the body were to strike against the rubber stop buffer before the wheel hit the base, the vibration behaviour of the wheel as well as of the relaxing spring between body and wheel would be influenced by the force exerted by the stop buffer acting in the opposite direction. The vibration obtained would represent false information about the vibration behaviour of the vehicle or the effect of its shock absorber. In addition, in the event of the wheel axle striking against the rubber stop buffer, some of the energy imparted to the wheel by the spring would be destroyed even before the wheel impinged on the base and the spring would not be able to cover its whole travel.

In judging the vibration behaviour, this would lead to the erroneous conclusion that the shock absorber present in the vehicle, the purpose of which is to damp the vibrating movement of the spring, and similarly destroy the energy of the spring, was serviceable.

In order to prevent the wheel axle from striking against the stop buffer before the wheel reaches the base, care must be taken to ensure that the height of fall, that is to say the distance between the position holding means and the base, does not exceed a certain maximum value which corresponds to the so-called residual spring deflection.

This value derives from practice and from the design conditions given by the vehicle manufacturers. According to these, the so-called residual spring deflection should be at least 50 mm in every vehicle, if there is no driver in the vehicle. If there is a driver in the vehicle, however, the residual spring deflection increases and the distance to the stop buffer becomes greater as a result of the driver's own weight. As a result of this, a certain safety margin is provided by means of which it is possible to avoid the axle striking against the stop buffer before the wheel reaches the base.

If the above-mentioned criteria are adhered to during the method, the following results can be derived from the measurement of the wheel pressure on the base, by appropriate curve analysis, without having to demount the individual components from the vehicle, namely:

1. to decide whether the vehicle has independent suspension or a rigid axle,
2. to determine the ratio between wheel weight and body weight,
3. to make a statement about the resilient behaviour of the tires (low section tires, tire pressures),
4. to ascertain the damping characteristics of the axle joints,
5. to make a statement about the quality of the shock absorber,
6. to make a statement about the ride comfort,
7. to make a statement about the ride hardness of the motor vehicle,
8. to make a statement about the ratio of tension to compression characteristics of the shock absorber,
9. to make a statement about the loading capacity of the motor vehicle and
10. to make a statement about the possible presence of a jammed shock absorber.

The apparatus which is suitable for carrying out the method according to the invention and which is equipped with a removable vehicle holding means disposed with spacing over a base, is characterised in that the base is constructed in the form of a measuring bridge with which the weight of the vehicle and the variation in time of the wheel pressure on the ground can be determined and that the distance of the vehicle holding means from the base corresponds at most to the distance predetermined by the residual spring deflection of the motor vehicle.

Further details are apparent from the features given in the sub-claims and from the following description of an example of embodiment with reference to the drawings.

DETAILED DESCRIPTION OF THE PREFERRED EMBODIMENT

Figure 1:
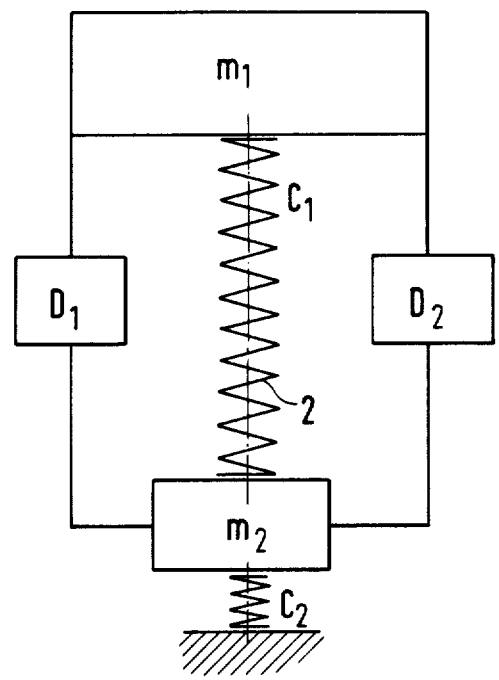
FIG. 1 is a diagrammatic illustration of a chassis construction.

In the motor vehicles known at present in road traffic, independent suspension is uniformly usual. It is therefore permissible to simplify a motor vehicle by the diagrammatic representation illustrated in FIG. 1 which enables the method according to the invention to be explained better.

Figure 2:
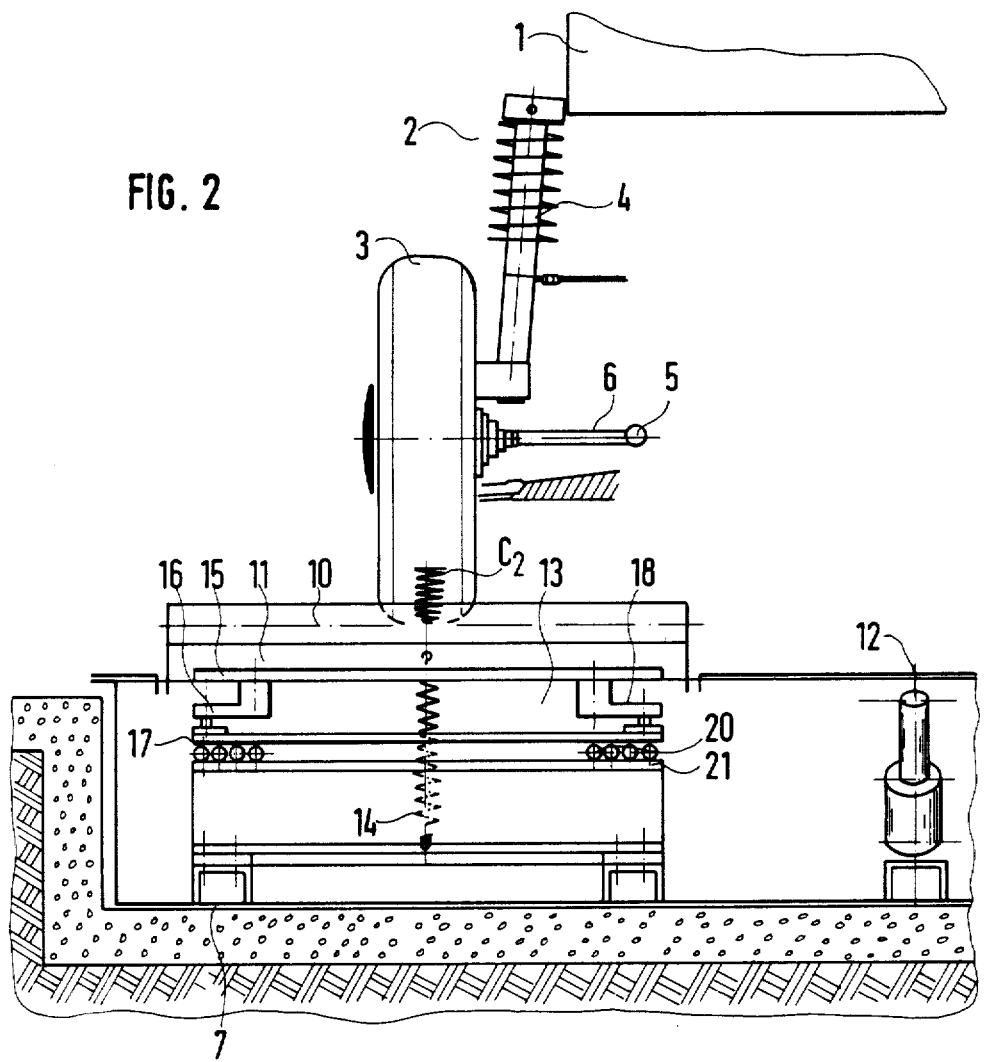
FIG. 2 is a side view of a diagrammatic illustration of the measuring bridge.

The mass of a body 1 of a motor vehicle, shown in a broken-away illustration in FIG. 2, is designated by $m_1$. The body 1 with the mass $m_1$ is connected, through a spring 2 with the elastic force $c_1$, to a wheel 3 with a mass $m_2$. The wheel's own elastic force, which is determined by the tire pressure and the type of tire, is designated by $c_2$. The oscillation of the spring 2 and of the mass $m_2$ is damped by a shock absorber 4, the damping force of which is represented in the FIG. 1 by the damping $D_2$ between $m_1$ and $m_2$, parallel to the elastic force $c_1$. The oscillation movement of the spring 2 and of the mass $m_2$ is in addition damped by the friction in the joints 5 of the wheel axle 6—in this example an independent suspension—as well as by the frictional forces which occur in the spring 2 during the movement which are converted into heat. This damping force is distinguished in FIG. 1 by the damping force $D_1$, likewise acting parallel to the elastic force $c_1$.

Figure 3:
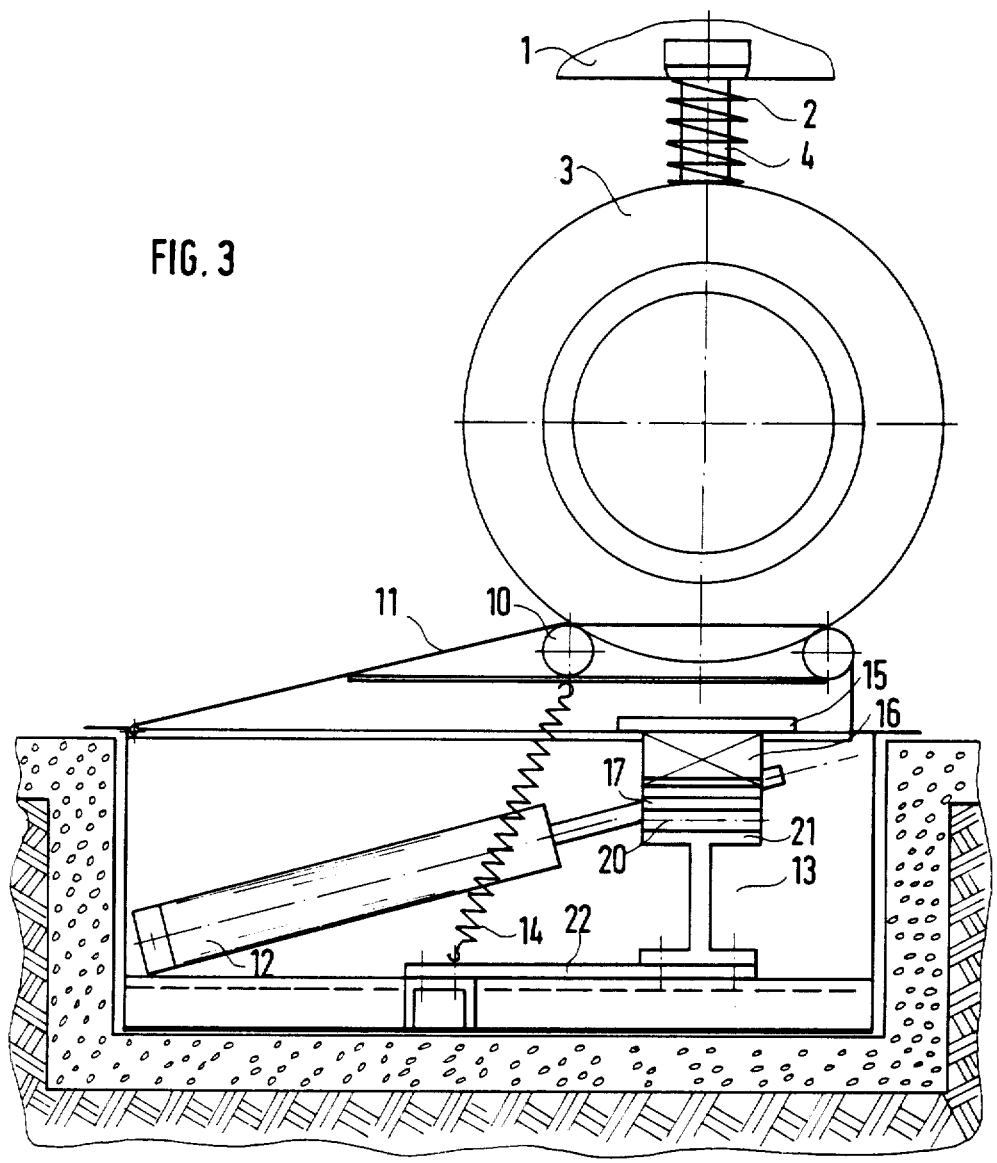
FIG. 3 shows a resilient mounting of the measuring bridge of FIG. 2.

The motor vehicle with independent wheel suspension, illustrated diagrammatically in FIGS. 2 and 3 by the reference numerals 1 to 6, rests with its wheel 3 on a position holding means 10 of a ramp 11. The same applies to the other wheel of the axle, which is not illustrated. Both wheels fall simultaneously onto the measuring devices associated with them, while the other two wheels rest on their base during the measuring operation. The position holding device 10 is maintained by means of a hydraulic cylinder 12 at the height of the ramp 11, about 50 mm above a measuring device 13, and is connected to the ground 7 through a tension device 14. As soon as the force of the hydraulic cylinder 12 is interrupted, the holding means 10 is pulled away from under the motor vehicle by means of the tension device 14. The dimensions of the position holding means 10 are larger than the external dimensions of the measuring device 13 so that they can be pulled away downwards, past and beyond the measuring device 13, without touching it. The position holding means 10 is caught by a brake device 23 in order to prevent it from springing back and striking back against the wheels 3 on the measuring device 13 thus falsifying the result. The brake device 23 is here formed by a hydraulic cylinder. Other suitable devices may, however, be selected.

Each measuring device 13 has a weighing plate 15 which is constructed in the form of a measuring bridge and which is rigidly connected to a frame 17 through bending test beams 16 with an L-section, disposed at each side. Two strain gauges 18 are fitted to each of the bending test beams 16 along a line of symmetry of the bending test beam 16. The results obtained with the strain gauges 18 are reproduced, by means of a recording device (not illustrated) in the form of curves which give information about the oscillation of the wheel force acting on the weighing plate 15. The measured values of the strain gauges 18 may, however, also be fed into an appropriately programmed computer which compares these actual values with calculated desired values and effects evaluation of the quality of the vehicle components.

The frame 17 is mounted at both sides on rollers 20 on a base plate 21 for displacement in the horizontal direction. As can be seen from FIG. 3, the measuring device 13 can be mounted on a spring 22 which can be excited to vibrations.

As soon as the motor vehicle has been driven onto the ramp 11 and its wheels 3 are located in the position holding means 10, the motor vehicle is about 50 mm above the measuring device 13. The driver can remain seated in the vehicle during the measuring operation in order to match the measurement result as far as possible to the running behaviour of the motor vehicle on the road. As soon as the position holding means 10 is pulled away downwards, the motor vehicle is subject to the laws of free fall. The bottom support of the wheels 3 of one vehicle axle disappears and the weight of the body 1 loading them from above first likewise loses its effect to the wheels. The spring suspension 2 of the wheels 3 can relax and the wheels 3 describe an arc about the joints 5 with their axle 6 as radius. In the course of this, the wheels 3 swing inwards out of their vertical position and impinge in an inclined position on the weighing plate 15 of the measuring device 13. This position of the wheels would in no way correspond to the actual running behaviour of the wheels on the road and would therefore also falsify the test result. This is particularly so because, as a result of the inclined position of the wheels 3, the shock absorber 4 can no longer oscillate freely but in some circumstances jams. As a result of this, the measurement result would misleadingly simulate shock absorber strength which does not really exist.

In order to achieve the effect that the wheels 3 are in their vertical position during the measurement and to make it possible for the body 1 also to be able to swing downwards freely in accordance with its behaviour during travel, the measuring device 13 is mounted on rollers 20 for lateral deflection on the support 21. When the wheels 3, which move quickly ahead of the heavy mass of the body 1 because of the force of the relaxing spring 2 exerted on them, impinge on the weighing plate 15, they are at first in an inclined position. As soon as the heavy mass of the body 1 swings after them, however, the wheels straighten out again and push the weighing plate 15 laterally outwards with their tires 3 adhering to the weighing plate 15. As a result of the oscillation of the body 1, a repeated inclination and righting of the wheel 3 is caused. The weighing plate 15 thus participates in this oscillating movement which serves as a criterion for the information as to whether the vehicle to be tested has independent suspension or whether it is a vehicle with a rigid axle. Since, at present, apart from certain cross-country vehicles, nearly all vehicles have independent suspension, the roller mounting of the weighing plate 15 is a necessary construction feature of the measuring device in order that the measurement results may not be falsified by jamming which is conveyed through the tires 3, adhering to the weighing plate 15, into the axle joint 5 from where it reacts on the shock absorber 4.

The measuring device 13 is so constructed that it is immaterial on which point of the weighing plate 15 the wheel 3 lands during the free fall. This characteristic of the measuring device 13 is necessary in order to be able to study motor vehicles with different track widths and motor vehicles with different wheel deflections during the free fall. For this purpose, the weighing plate 15 is supported on the frame 17 through the bending test beams 16. As soon as the motor vehicle falls on the weighing plate 15, its total weight, that is to say $m_1+m_2$, and the variation with time of the wheel pressure exerted on the weighing plate 15, are ascertained by the strain gauges 18 by the so-called difference method.

In order to judge the measurement results, it is necessary to be sure what happens during the fall of the motor vehicle.

In this connection, the device which initiates the falling of the pair of wheels of the motor vehicle is of considerable importance. At first, the motor vehicle rests on the position holding means 10 which is connected to the ground by a tension spring 14 and is held up by means of the hydraulic cylinder 12 in a raised position above the measuring device 13. In order to allow the wheels 3 of the motor vehicle to impinge on the weighing plate 15 in free fall, without being adversely affected by external forces, the position holding means 10 must, if possible, be pulled away under the motor vehicle even more quickly than the wheel 3 moves downwards towards the weighing plate 15. The velocity of the wheel 3 is greater than the speed of free fall, that is to say also greater than the velocity of the mass $m_1$ of body 1, because the very strong spring 2, which is at first compressed by the weight of the motor vehicle, relaxes after removal of the support 10 and exerts a powerful thrust on the wheels. This force is added to the downward action of gravity on the wheels 3 so that these move quickly ahead of the inert mass $m_1$ of the body 1. They come into contact with the weighing plate 15 and, in accordance with their own vibration behaviour, under the influence of the spring 2 and shock absorber 4, and with simultaneous action of the damping $D_1$ caused by the axle joint bearing arrangement and the ratio of friction of the spring 2, transmit a varying pressure to the weighing plate 15 which is recorded as an oscillation or vibration by the strain gauges 18. In this connection, reference should be made to the graphs of FIGS. 6a, 6b, discussed below.

In order to move the position holding means 10 down quickly enough, it is connected to an appropriately strong tension spring 14. In addition, a brake device 23 is provided which prevents the vehicle holding means 10 falling on it from springing back.

The above-mentioned acceleration of the wheel 3 by the spring 2 is braked by the shock absorber 4, as stated. That is to say, the energy of the spring 2 is converted into heat in accordance with the action of the shock absorber 4. This is the purpose for which it is intended. Now the object of the test is to ascertain whether the shock absorber is still able adequately to fulfill this purpose. This is the case when the deflection of the wheel 3 caused by the relaxation of the spring 2 is as small as possible. The shock absorber 4 can then be considered satisfactory.

The damping caused by the shock absorber 4 is further supplemented by the frictional forces exerted by the axle joints 5. It is ture that in the normal case these forces are relatively small and can be ignored in comparison with the forces exerted by the shock absorber but they become important if friction, which can be caused by jamming, occurs in the axle joint, for example as a result of accident damage. As a result of this, the judgement of the quality of the shock absorber could be falsified because these forces act on the spring 2 in the same sense as those of the shock absorber 4.

An expert can, however, draw conclusions from the appearance of the measurement curves obtained and analyze the forces acting on the spring 2 from these curves.

Figure 6A:
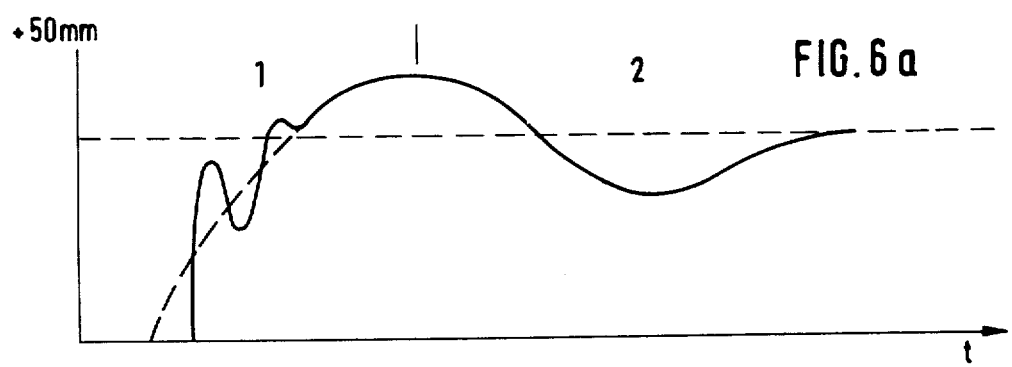
FIG. 6a shows a graph of the oscillation of the total pressure on the base after the impact of a motor vehicle with hard suspension.
Figure 6B:
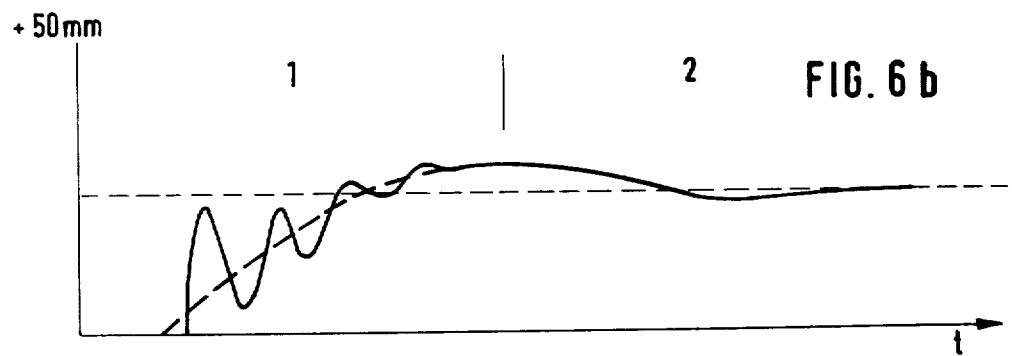
FIG. 6b shows a graph of the oscillation of the total pressure on the base after the impact of a motor vehicle with soft suspension.

FIGS. 6a and 6b reproduce the vibration behaviour of the weighing plate 15 depending on time, after the holding means 10 for the motor vehicle driven onto the ramp 11 has been pulled away from under its wheels 3 and the vehicle has fallen onto the weighing plate 15. In other words, the curves correspond to the pressure, varying with the time, which the bouncing vehicle, which has fallen onto the weighing plate 15, exerts on the weighing plate 15.

This pressure corresponds to the wheel pressure which transmits to the weighing plate 15 the forces exerted vertically downwards on the wheel 3 by the two springs $c_1$ and $c_2$ connected in series. In the course of this, the springs $c_1$ and $c_2$ are caused to vibrate by the forces exerted on them by the free falling masses $m_1$ and $m_2$, and this vibration is in turn influenced by the damping factors $D_1$ and $D_2$ already mentioned. From this it follows that with known values for the masses $m_1$ and $m_2$ and with a specific tire pressure $c_2$, conclusions about the state of the damped spring system $c_1$, $D_1$, $D_2$ can be drawn from the measurements of the pressure on the weighting plate 15. This means that it is possible to judge, from the shape of the curves, whether it is a question of a spring system with hard springs and a hard shock absorber, or of a soft spring system and a soft shock absorber.

The pressure curve shown in FIG. 6b is typical of a soft spring system; the curve 6a corresponds to a hard spring system.

Nevertheless, in order to be able to draw conclusions in detail about the state of the components present in the motor vehicle, namely the spring $c_2$, the shock absorber $D_2$ and the axle joint 5, a more precise analysis of the curves is necessary.

Since the curves are sum curves in each case, which result from the superimposition of various vibrations, for the evaluation of the measurement results it is first necessary, in general, to consider which individual vibration lines are superimposed and how their variation depends on the state of the factors determining them. The study will have to start from the separate vibration behaviours of the system $m_2$, $c_2$ and of the system $m_1$, $c_1$, $D_1$, $D_2$, in order then to be able to evaluate the co-operation of the two systems.

As soon as free fall of the motor vehicle is initiated, the springs $c_2$ and $c_1$ relax. The acceleration of the fall of the mass $m_2$ is increased by the force of the relaxing spring $c_1$, acting downwards on the mass $m_2$, so that the mass $m_2$ moves quickly ahead of the mass $m_1$ which at first is essentially subject only to the force of gravity. The magnitude of the kinetic energy of the mass $m_2$ when it impinges on the weighing plate 15 is a measure of the accelerative force exerted on the mass $m_2$ by the system $c_1$, $D_1$, $D_2$ during the free fall, and hence is a criterion for the quality of the shock absorber $D_2$. If the effect of the shock absorber $D_2$ on the spring $c_1$ is only slight, the spring $c_1$ can easily relax and the acceleration of the mass $m_2$ by the spring $c_1$ is very great. The impact of the wheel 3 on the weighing plate 15 then takes place very quickly after the beginning of the fall, with great force. The beginning of the vibration curve is close to the origin of the co-ordinate system.

After the impact of the wheel 3 on the weighing plate 15, however, the tire is again compressed by the powerfully accelerated wheel mass $m_2$, that is to say the resilience of the spring $c_2$ representing the tire itself is again charged and ultimately begins to vibrate as a result of repeated discharging and charging.

If the spring $c_1$ can relax to a great extent during the free fall, the system $c_1$, $D_2$ is a relatively softly springing vibration system. Thus the spring $c_1$ offers little resistance even to the spring $c_2$ relaxing again after the impact of the wheel and the spring $c_2$ can vibrate relatively unhindered at the beginning of the vibration, and the system $c_1$, $D_2$ is stressed alternately in tension and compression.

According to the inherent damping of the system $m_2$, $c_2$ which is influenced by the action of the vibrating system $m_1$, $c_1$, $D_2$—the damping $D_1$ which originates from the axle joint, can be ignored at first because it is generally only slight,—this vibration nevertheless dies out relatively quickly.

The period of time during which the masses $m_2$ and $m_1$ vibrate simultaneously, is very short. During this period of time, the shock absorber 4 is alternately stressed in tension or compression. This briefly alternating tension/compression behaviour of the shock absorber can be seen from the block diagram of FIG. 5 indicated under FIG. 4. The region in question is distinguished by hatching.

Whereas up to the impact of the wheel 3 on the weighing plate 15, the spring $c_1$ could also relax and the shock absorber $D_2$ was consequently only stressed in tension, these conditions change after the impact of the wheel 3. The spring $c_1$ is compressed by the mass $m_1$ falling with acceleration and so the shock absorber $D_2$ is only stressed in compression after the compression/tension phase of the transient vibration has died away. This oscillation behaviour corresponds to the period of time designated by "phase 2" in the curve lines of FIGS. 6a and 6b.

Figure 4:
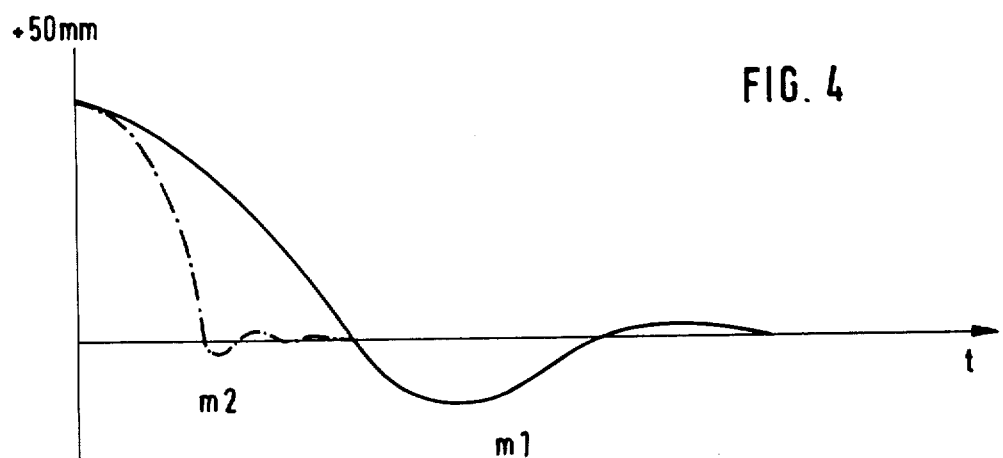
FIG. 4 shows a graph in which the distances covered by the wheel with mass $m_2$ and by the body with mass $m_1$, after the fall of the motor vehicle has been initiated, are shown against time.
Figure 5:
FIG. 5 shows a block diagram in which the stressing of the shock absorber (tension/compression) during and after the fall of the motor vehicle is shown against time.

Understanding of the trace of the curves shown in phase 2 of FIG. 6a and 6b is easier if these curves are co-ordinated with the diagram shown in FIG. 4. In this, the position of the masses $m_1$ and $m_2$ during the vibration process are plotted against time, the normal position of wheel and body being selected as a datum line for these masses. The free fall of the mass $m_2$, accelerated in comparison with the mass $m_1$, until the wheel 3 impinges on the weighing surface 15 can be seen from the curve for $m_2$ (curve in chain line). After the impact of the wheel 3, the tire is compressed, that is to say the accelerated mass $m_2$ compresses the spring $c_2$ and the mass $m_2$ passes somewhat below the datum line, that is to say below its normal position.

The conduct of the mass $m_1$ is represented by the full line curve. The beginning of the curve corresponds to free fall. After the moment of impact of the wheel 3, the free fall of the body 1 with the mass $m_1$ is slowed down somewhat by the action of the spring $c_1$ relaxing upwards. Nevertheless, the residual acceleration of the mass $m_1$ is sufficient for the mass $m_1$ to move down beyond the datum line as a result of its inherent kinetic energy, the spring $c_1$ being compressed. The cusp point of the mass $m_1$ is below the datum line. Here the kinetic energy of the mass $m_1$ is exhausted and the energy stored in the spring $c_1$ has reached its maximum. The spring $c_1$, compressed by the mass $m_1$ relaxes and urges the mass $m_1$ upwards. The oscillation process described is repeated depending on the spring strength of the system $c_1$, $D_1$, $D_2$ and dies away more or less quickly, the shock absorber 4, like the spring 2, being stressed alternately in tension or compression until finally both masses $m_1$ and $m_2$ have reached their neutral zero position, (see block diagram FIG. 5).

With knowledge of the trace of the curve of FIG. 4 the second phase of the course of vibration of the pressure on the weighing plate 15 as shown in FIG. 6a and 6b becomes understandable.

Here the spring $c_1$, compressed by the mass $m_1$, begins to relax again, the mass $m_1$ is urged upwards, the pressure decreases. With a hard suspension $c_1$, $D_2$, the relaxation of the spring $c_1$ will be effected very quickly. This means that the compression amplitude will swing far below the horizontal broken line which represents the basic pressure determined by the real weight of the motor vehicle (static weight). The pressure exerted on the weighing plate 15 is therefore less than the static weight of the motor vehicle present on the weighing plate 15.

From the trace of the curves for the masses $m_1$ and $m_2$ shown in FIG. 4, it can be seen, however, how their behaviour influences the course of vibration of the pressure as shown in FIGS. 6a and 6b during phase 1 of the transient oscillation. The portions of curves each shown in broken lines in FIGS. 6a and 6b, which may be designated as the fundamental oscillation, can be extrapolated from the vibration behaviour of the mass $m_1$ shown in FIG. 4.

The steepness of the curves shown in broken lines in FIGS. 6a and 6b and the height of the first curve maximum represent a measure of the relationship of the forces present in the vibrating system $c_1$, $m_1$, $D_2$.

The curves in full lines in FIGS. 6a and 6b in the region of phase 1 represent the sum curve which results from the vibration behaviour which corresponds to the spring behaviour of the tire and the oscillation behaviour of the system $m_2$, $c_2$.

With a soft suspension, that is to say a soft spring $c_1$ with a soft shock absorber 4, the vibration behaviour of the spring $c_2$ described above is found at first. The ascending flank of the fundamental oscillation curve (in FIG. 6b) is long and not very steep. The first oscillation amplitude is relatively flat and the period of time before the occurrence of the first oscillation maximum is relatively long, if the curve shown in FIG. 6b (soft spring system) is compared with the curve shown in FIG. 6a (hard spring system).

With a hard spring system $c_1$, $D_2$, the transient vibration is substantially suppressed because the hard spring $c_1$ prevents a multiple vibration of the spring $c_2$. The beginning of vibration is slightly later than with a soft system because the wheel 3 with the mass $m_2$ is not accelerated so much by the relaxing spring $c_1$. The rise of the curve is steep, the first amplitude is high and is reached within a short time.

The following conclusions can be drawn from these first portions of the curves: slow rise of the fundamental curve with soft suspension means high ride comfort; steep rise of the fundamental curve with hard suspension means less ride comfort.

The quality of the shock absorber 4 follows, however, from the pressure curve during the 1st phase in which the spring behaviour of the wheel 3 is superimposed on the fundamental oscillation of the body 1.

By means of the measuring system described, therefore, it has become possible, by analysis of the pressure on the weighing plate 15, to eliminate the characteristic of the shock absorber from the total vibration behaviour of the motor vehicle and to make a clear statement about the quality of the shock absorber without having to demount this.

On the basis of the values $m_1$, $m_2$, $c_1$, $c_2$, known for each vehicle, it is possible to draw up theoretical vibration curves and compare them with the curves actually found experimentally.

In practice, of course, the data necessary for determining the theoretical curves would be fed into a computer which is in a position to compare the curves determined experimentally point by point with the theoretical curves and to report, in accordance with the program fed in, faults which go beyond the permissible criteria.

I claim:

1. A method of checking the state of the chassis of a motor vehicle wherein the motor vehicle is brought onto a position holding means spaced above a support and then the position holding means is removed so that the motor vehicle falls with its front or rear axle in free fall onto the support, characterised in that
   1. the distance between the position holding means and the support, which corresponds to the height of fall of the motor vehicle, is selected so that it corresponds substantially to the residual spring deflection (distance between wheel axle and buffer stop) predetermined by the design of the motor vehicle but does not exceed this,
   2. the position holding means is removed at least as quickly as the wheel or wheels to be tested of the motor vehicle would fall under the action of the force of gravity and the simultaneous action of the relaxing spring present between wheel and body, ignoring the oppositely directed action of the shock absorber and of the frictional forces (for example in the axle joint bearing and in the springs), and
   3. the variation in time of the wheel pressure acting on the support is measured.

2. A method as claimed in claim 1, characterised in that, in the case of a motor vehicle with independent suspension, the support is moved in the horizontal direction by the wheel impinging on it according to its vibration behaviour predetermined by its suspension in the axle bearings and by the vibration behaviour of the body.

3. An apparatus for carrying out the method as claimed in claim 1, comprising a removable vehicle holding means which is spaced above a support, characterised in that the support (15) is constructed in the form of a measuring bridge (13) whereby the vehicle weight and the variation in time of the wheel pressure can be determined and that the distance of the vehicle holding means (10) from the support (15) corresponds at most to the distance predetermined by the residual spring deflection of the motor vehicle.

4. An apparatus as claimed in claim 3, characterised in that the measuring bridge (13) is constructed in the form of a static weighing machine whereby the weight of the motor vehicle can be determined independently of the point of impact of the wheel (3) on the support (15), and that the measuring bridge (13) contains a further measuring device to determine the variations in time of the pressure exerted.

5. An apparatus as claimed in claim 4, characterised in that the pressure is detected by means of strain gauges (18).

6. An apparatus as claimed in claim 3, characterised in that the measuring bridge (13) is mounted on a base plate (17) and is movable on this in a horizontal direction, at least to one side.

7. An apparatus as claimed in claim 3, characterised in that the vehicle holding means (10) is connected to a prestressed spring element (14) which, after the vehicle holding means has been released, removes this from under the wheel at a speed at least equal to the speed of the wheel (3), preferably at a greater speed.

8. An apparatus as claimed in claim 3, characterised in that the vehicle holding means (10) comprises an opening, the dimensions of which somewhat exceed the dimensions of the measuring bridge (13) disposed below the opening.

9. An apparatus as claimed in claim 3, characterised in that the measuring bridge (13) is resiliently mounted (at 22).

10. An apparatus as claimed in claim 3, characterised in that the measuring bridge (13) detects vibrations up to at least 1 kHz.

11. An apparatus as claimed in claim 3, characterised in that a brake device (23) is provided for the vehicle holding means (10) to prevent this from springing back after it has been removed from under the wheel by releasing its locking.

* * * * *